United States Patent [19]

Bonifer et al.

[11] Patent Number: 4,958,723
[45] Date of Patent: Sep. 25, 1990

[54] ROLLER TRACK

[75] Inventors: Edgar Bonifer, Muenster; Walter Duttine, Offenbach; Hartwig Reckemeier, Maintal, all of Fed. Rep. of Germany

[73] Assignee: Mannesmann AG, Duesseldorf, Fed. Rep. of Germany

[21] Appl. No.: 315,336

[22] Filed: Feb. 22, 1989

Related U.S. Application Data

[63] Continuation of Ser. No. 777,034, Sep. 17, 1985, abandoned.

[30] Foreign Application Priority Data

Sep. 17, 1984 [DE] Fed. Rep. of Germany ....... 3434092
Jun. 21, 1985 [DE] Fed. Rep. of Germany ....... 3522177

[51] Int. Cl.⁵ .............................................. B65G 13/06
[52] U.S. Cl. ..................................... 198/781; 198/790
[58] Field of Search ........................ 198/781, 783, 790

[56] References Cited

U.S. PATENT DOCUMENTS

| 3,420,355 | 1/1969 | Good et al. | 198/781 |
| 3,612,248 | 10/1971 | Wallis | 198/781 |
| 3,760,932 | 9/1973 | Schneider | 198/781 |
| 4,453,627 | 6/1984 | Wilkins | 198/781 |
| 4,488,638 | 12/1984 | Morgan et al. | 198/781 |
| 4,502,593 | 3/1985 | van den Goor | 198/790 X |
| 4,609,098 | 9/1986 | Morgan et al. | 198/781 |

FOREIGN PATENT DOCUMENTS

| 0023462 | 2/1981 | European Pat. Off. | 198/781 |
| 2315862 | 8/1974 | Fed. Rep. of Germany. | |
| 1543506 | 10/1968 | France | 198/781 |
| 7919607 | 5/1982 | France. | |
| 7903711 | 11/1980 | Netherlands | 198/781 |

Primary Examiner—Joseph J. Rolla
Assistant Examiner—Cheryl L. Gastineau
Attorney, Agent, or Firm—Ralf H. Siegemund

[57] ABSTRACT

A roller track is arranged in sections in that individual groups of carrier rollers can be selectively drivingly connected to and disconnected to and from a drive belt for section stop-and-go operations permitting a buffer location for each section, there being vertically displaceable belt rollers for engaging the belt to obtain driving connection to and disconnection from carrier rollers. The track includes a plurality of control rollers, control bars and control cams. The belt rollers are eccentrically mounted in the control rollers such that depending upon the angular position of the control rollers the respective belt rollers are lifted or lowered for engagement with or disengagement with the belt.

24 Claims, 7 Drawing Sheets

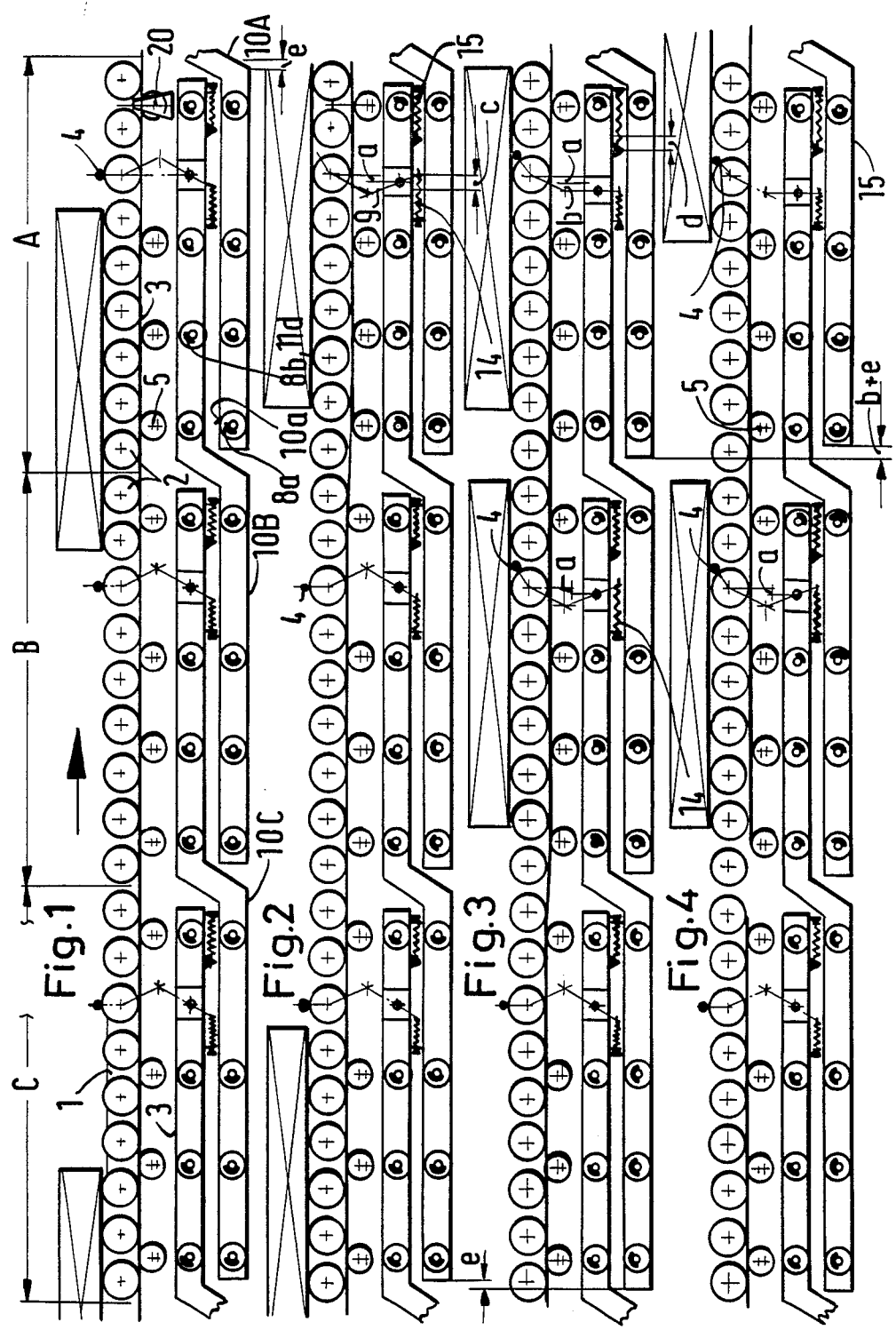

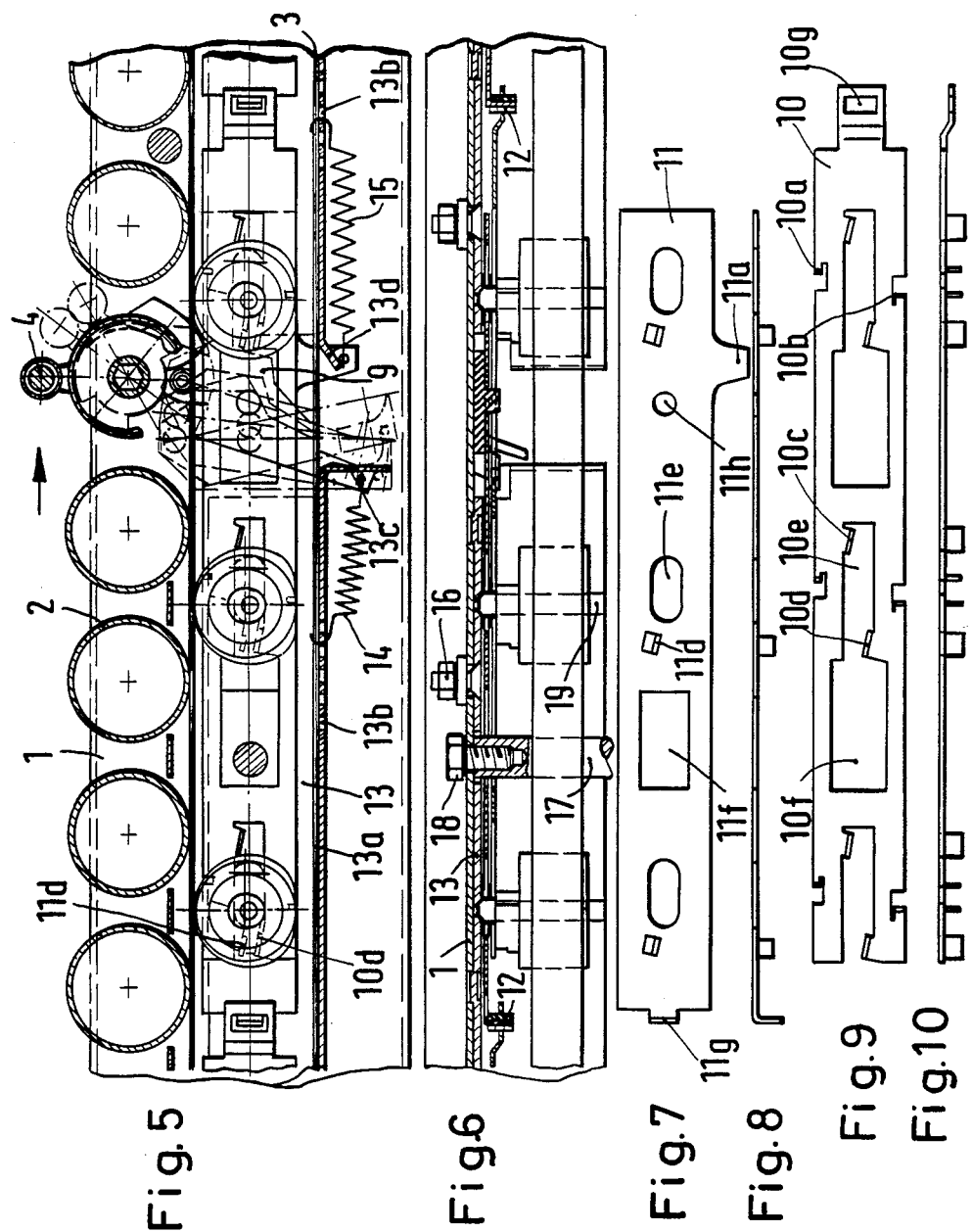

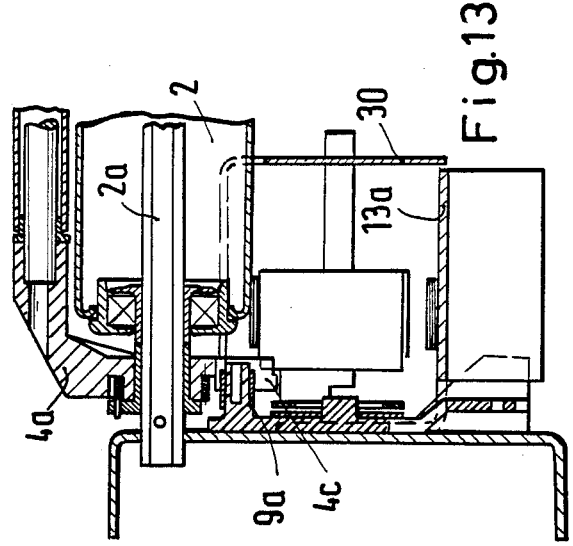
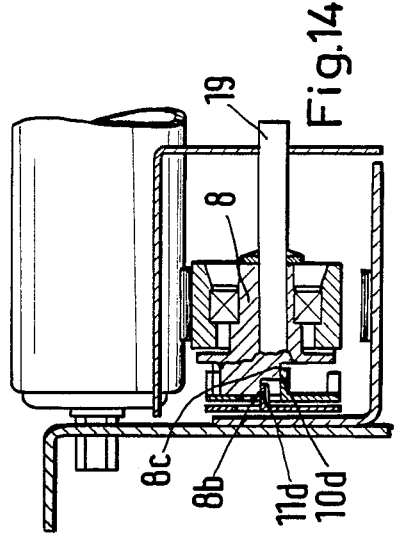
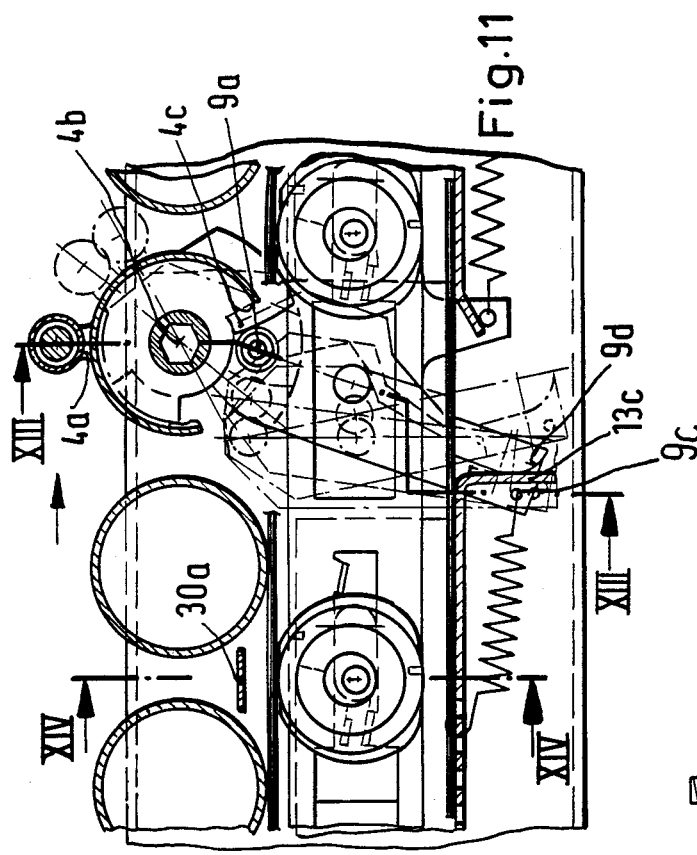
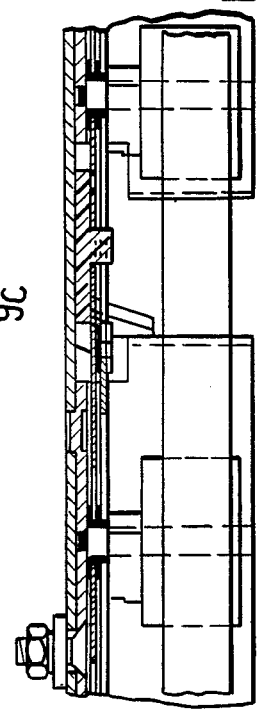

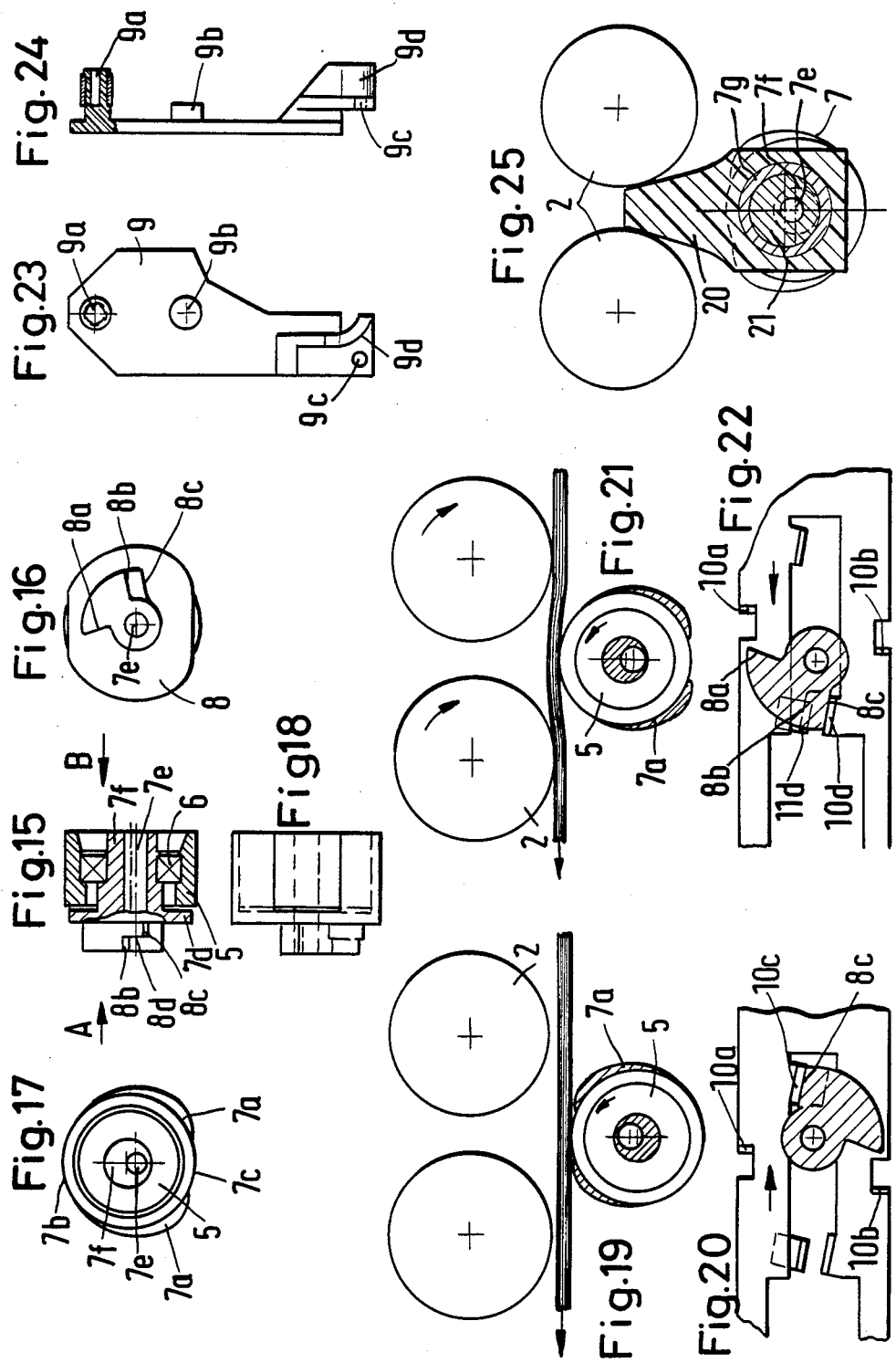

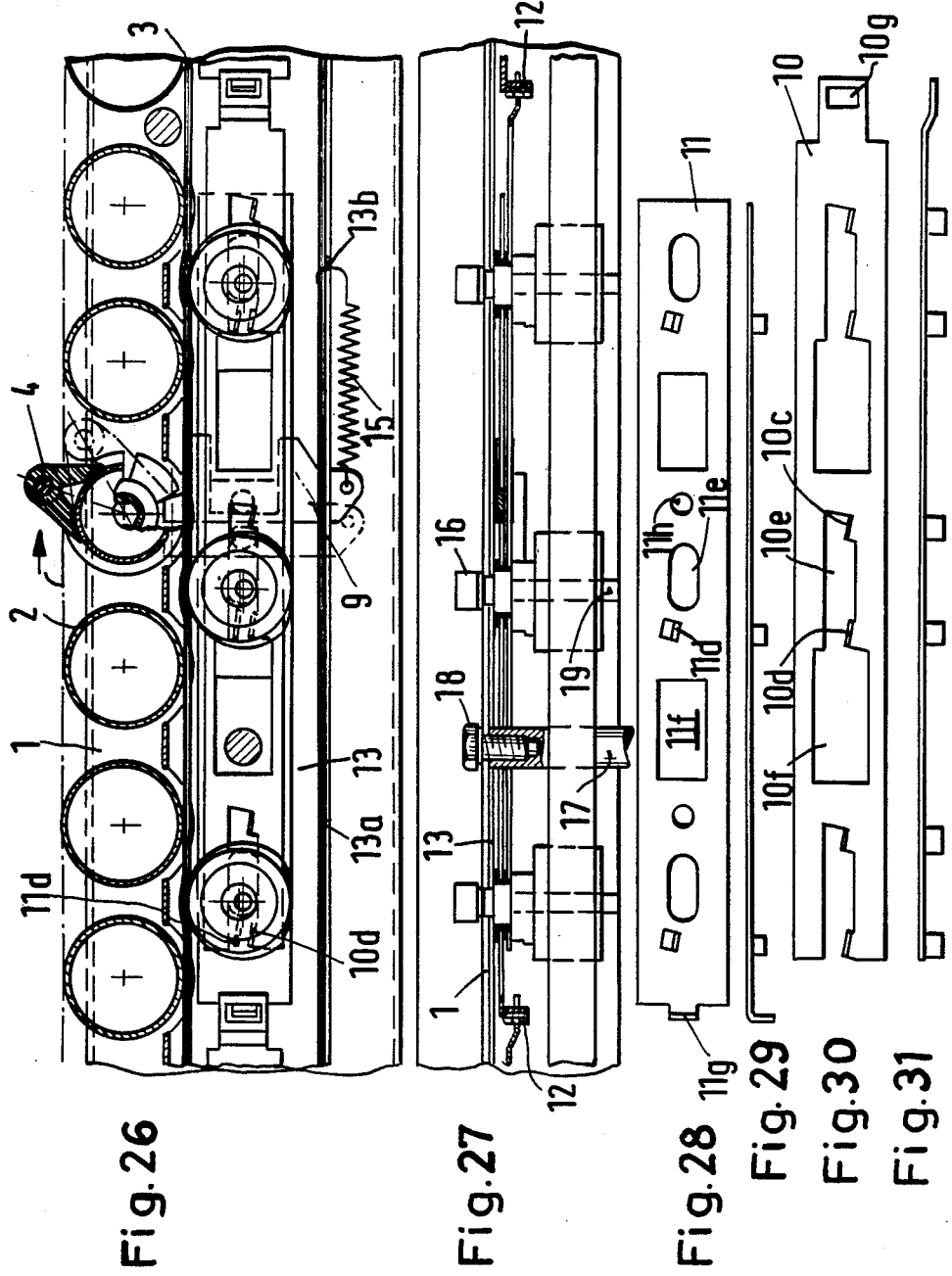

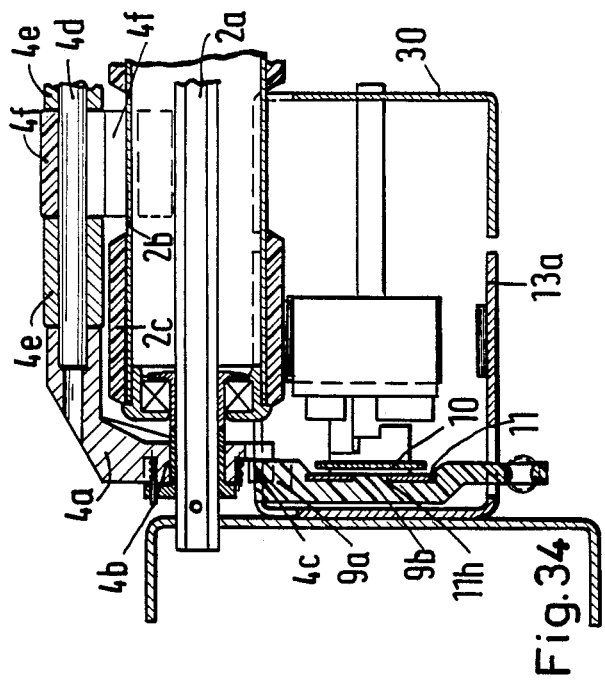
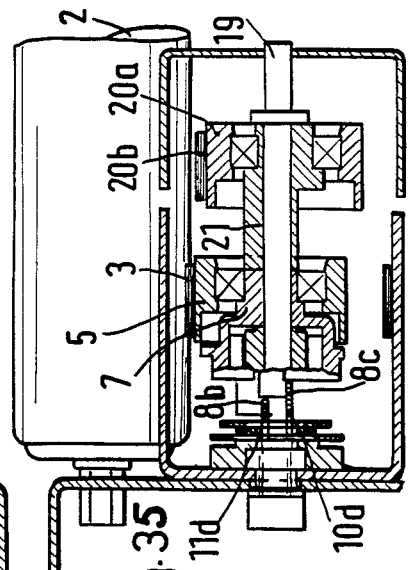
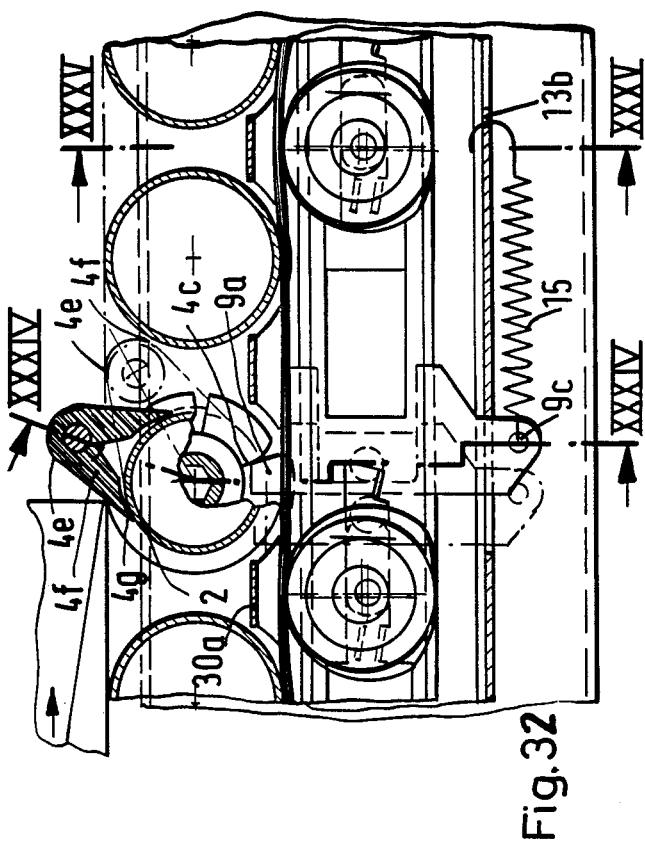
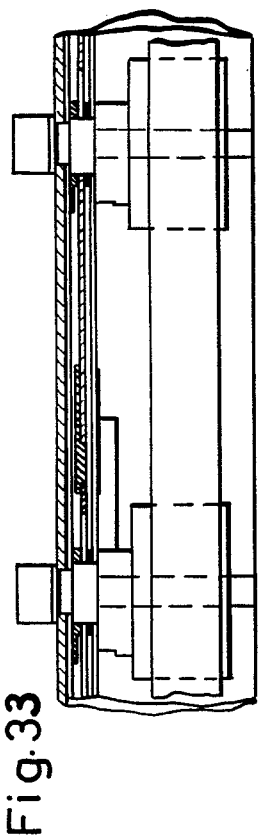
Fig.34
Fig.35
Fig.32
Fig.33

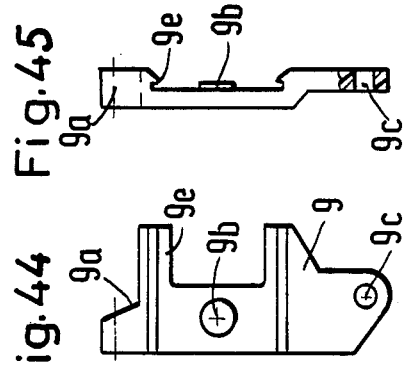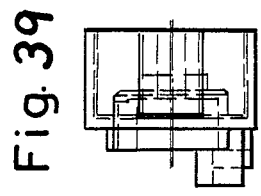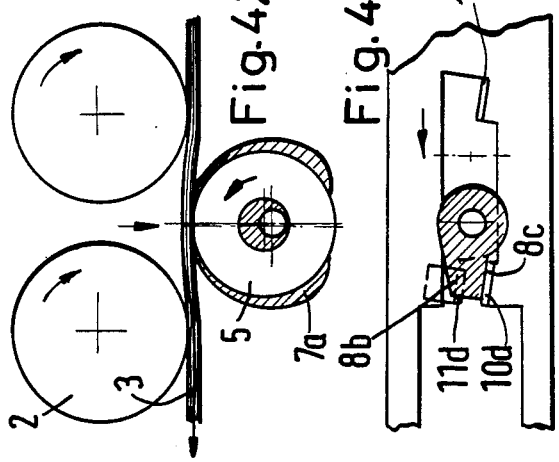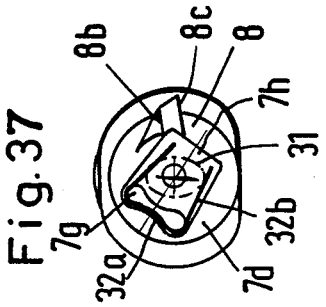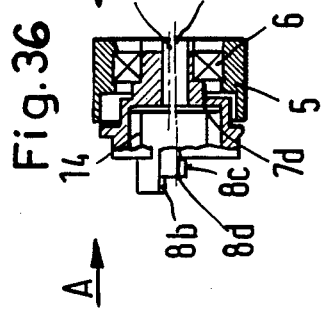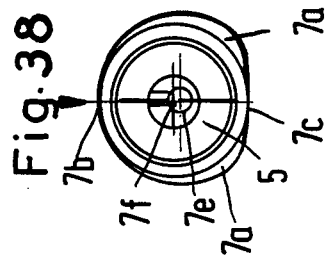

ROLLER TRACK

This is a continuation of co-pending application Ser. No. 777,034 filed on Sept. 17, 1985, now abandoned.

BACKGROUND OF THE INVENTION

The present invention relates to a stop-and-go kind of roller track with carrier rollers and actuating elements projecting into the transport path for purposes of releasing a drive belt which can be lifted and lowered respectively for engagement and disengagement with the carrier rollers. More particularly, the invention relates to a roller track wherein groups of rollers can be selectively drivingly connected to and disconnected from a belt drive.

Stop-and-go type roller tracks wherein sections or groups of rollers are controlled individually are shown for example in German printed patent application No. 2,815,862. Herein a piece of freight or luggage will overcome the force of springs by means of actuating levers whereby the spring force is sufficiently strong so that they can operate the belt rollers for purposes of lowering them. This kind of stop-and-go roller track with section control is usable only if the pieces of freight are at least approximately similar in weight. This is often not the case and cannot necessarily be expected so that this type of roller track is not useful in many cases.

A similar type of roller track is disclosed in printed French Pat. No. 7,919,607 but this track is disadvantaged by the fact that the freight to be buffered will run onto a storage location which has already been switched off depending upon the kinetic energy and the friction involved. It may easily happen that the kinetic energy is so large and the friction so low that the freight overshoots the destined storage location and pushes against stored and stopped pieces of freight ahead. In case the relationship is reversed the piece of freight may not even reach the destined location. Therefore the stop operation or the stopping of the piece of freight itself, i.e. the attainment of position and stopping is not certain. This includes also the possibility that the operation is as such uncertain for reasons of illdefined end positions. As far certain particulars are concerned and as they are disclosed in that patent, the requisite turning of control rollers is certain because the center of gravity of that roller is not on but next to the side of the axis of rotation and thus exerts only a relatively small torque upon that roller. This means that in such cases the torque may be insufficient for turning the control roller which is compounded whenever soil and dirt has accumulated and the roller is poorly lubricated.

DESCRIPTION OF THE INVENTION

It is an object of the present invention to provide a new and improved buffer type roller track with sections operated in a stop-and-go mode wherein particularly a drive belt can be brought into and out of engagement with the track rollers of a section.

It is a particular object of the present invention to provide such a roller track such that the freight to be buffered will with certainty come to rest at a predetermined buffer storage location and under conditions which permit resumption of the transport at a later time.

It is a special object of the invention to provide a new and improved roller track arranged in sections in that individual groups of carrier rollers can be selectively drivingly connected to and disconnected from a a drive belt for section by section stop-and-go operation permitting transport into, buffer storage in and further transport from a buffer location defining track sections, there being vertically displaceable belt rollers for engaging the belt to obtain driving connection to and disconnection from carrier rollers.

In accordance with the preferred embodiment of the present invention it is suggested to provide a plurality of control rollers each having oppositely situated peripheral openings, the belt rollers are respectively mounted eccentrically in the control rollers so that depending upon the angular position of the control rollers the respective belt rollers are lifted or lowered for engagement with or disengagement from the belt; a plurality of control bars are arranged pairwise in overlapping relation such that respective two of the bars are effective in each roller track and buffer location; control cams respectively coupled to the control rollers and are in engagement with at least one control bar for triggering turning of the control roller to change the disposition of respective control roller to temporarily engage the belt so that the belt turns the control roller over a particular angle and turns it into a position in which the belt roller therein is retracted from the belt; an actuator bar, known per se, is provided for each of the groups of carrier rollers and buffer stations and extends beyond the carrier rollers into a path of transport as defined by the roller track; the actuator bar is coupled to one of said control bars to permit, upon being turned down by a load, the latter bar to initiate turning of the control roller such that the respective belt roller therein will disengage from the belt, the belt provides for turning of the control roller by frictional engagement so that by operation of the control and belt rollers the belt will disengage from the carrier rollers of the buffer station and the carrier rollers of the buffer station will come to rest; spring means are provided for intercoupling the control bars to obtain control operations of a station in response to an operating state of the respective next downstream station so that the load on the rollers of a station can be stopped if there is a buffered and stored load on the next downstream station.

Since the belt roller penetrates the control roller in areas which face each other the control roller receive a 180 degrees turning motion for purposes of control whereby the eccentric mounting of the belt roller is used for lifting and lowering the drive belt. The force and power storage in the springs causes with certainty the shifting of one of the control bars after the operating cam has released bar via appropriate control stops and cams. This procedure initiates the turning motion of the control roller. After an initial turning motion the control roller is carried along by means of a drive belt, engaging a peripheral segment of the control roller until it has undergone a 180 degrees turn and is now stopped by its cam to thereby gain abutment on one of the control stops of the switch bar or bars.

The control roller in accordance with further features of the invention is provided with a concentric bore for an axle and is associated with an eccentrically mounted bearing ring while a belt roller is in turn concentrically mounted in a bore which is concentric to the bearing ring. The belt roller projects through an arc shaped azimuthal opening in the periphery of the control roller while on the opposite side thereof another opening is provided, also for accommodating the belt roller. The two openings cover an angle of about 80 degrees of the periphery of the control roller. The surface of the control roller has a smooth transition to the opening through which the belt roller projects In a further feature of the invention each control bar extends over two juxtaposed buffer places and storage stations whereby correspondingly two control bars are arranged in each station in side by side relation. They thus overlap so that the control rollers of one buffer location can be controlled from the principal control bar associated with the particular buffer location and station as well as from the principal control bar of the buffer location downstream. As stated a control bar extends over two buffer locations, and, depending on the type of goods to be transported and on the length of each buffer location, one can expect that such a bar has a length of several meters. This means that such bars by and in themselves are rather cumbersome and particularly for purposes of inventory, transport and assembly they may easily bend or even kink. In order to avoid this potential drawback each control bar will be assembled from different parts or one can also say that certain given control bar proper can be supplemented and extended by one or more additional extension pieces. Also, a control bar being associated with a particular storage location and station may be assembled from several different parts. One needs only a few standard length parts which can be combined to thereby accommodate any desired buffer location length. Control bar as well as extension pieces will be interconnected through a slot in one of the parts provided for receiving a fastening angle piece of the other part and they are fastened to each other by means of a clamping piece in the desired position.

The basic control bar as well as any extension pieces are fastened to an element carrier by means of axles which traverse slots for the several control rollers. The element carrier is arranged alongside one of the sides of the basic support frame. Each control bar moreover has trigger noses disposed, above and below the slots and oriented in the direction of displacement. These noses initiate the rotation of the control rollers through appropriate trigger stops therein. Moreover, the control bar as well as any extension pieces are provided with turn on and off stops arranged in the direction of extension of the roller slots and extending perpendicularly thereto. All these stops are actually projections resulting from flanging of the bar elements which are basically sheet metal strips and are therefore producible with little expenditure. Control bars as well as bar extensions moreover have mounting slots clearingly traversed by transverse elements which complete the frame; any of the control rollers is journaled by means of their roller axles using bearings in one of the side walls of the frame. The side walls are constructed as an element of L-shaped cross section supporting on its horizontal lower leg the return portion of the respective belt.

In accordance with a further feature of the invention any of the control bars is actually held by a two arm lever on the axle of one of the carrier roller in a station. Moreover there is a length compensating connection provided being configured as a cam element cooperating with a sliding pin on an intermediate lever. Such a control bar is accordingly connected to that intermediate lever. The lever in turn is mounted by means of a tilt or pivot pin and a matching bore of a control bar extension. The intermediate lever is provided with a bore below the tilt pin for fastening a compensating spring constructed as a tension spring. With its other end this spring is connected to the lower portion of the element carrier; the position being determined when the actuator bar or the station has been pushed down. This compensating spring cooperates with a return spring acting in opposite direction; this return spring is disposed and mounted between a spring connecting eye in the respective control bar extension or the control bar itself and another connecting and fastening bore of the element carrier. In order to vary the spring bias several spring connecting bores are arranged one behind the other. The pivot motion of the intermediate lever is limited upon pivoting of the actuator bar into the transport path, there being an appropriate abutment surface provided on the intermediate lever, bearing against an angled off abutment of the element carrier projecting from the lower stringer zone of the belt.

For increasing the accuracy of stopping a piece of freight in a station, a brake may be provided. One or several of the control rollers may be provided with an eccentric pin, eccentric relative to the eccentric bearing ring. This brake in turn may be mounted on that pin under utilization of a rotatable eccentric ring. Preferably the brake is arranged right at the spot where the front end of the piece of freight is to come to rest. The carrier rollers provided at that point may be provided with a friction layer in order to enhance sliding friction between carrier roller and freight.

In an alternative form of constructing the control bar, the bar may be provided with a locking nose at the end facing the direction of transport and cooperating with a locking finger which grips around that nose. The finger may be provided on the actuator bar projecting into the roller track whereby a control spring with a slide nose bears against a cam element which rises in direction of transport and pertains to the next control bar downstream. In case of an axial shift of the downstream control bar but in a direction opposite the direction of transport the slide cam lifts the slide end of the control spring. This spring is configured as a leaf spring and envelops the turning axle of the switching lever at about an angle of 270 degrees and engages a spring holding pin of the control bar by means of a suitable eye. The compensation spring as well as the return spring are on one hand connected through a holding pin or pins in a control bar extension while on the other hand they engage an eccentric spring pin of the control roller as mounted on the element carrier.

In furtherance of the invention the rotatable control roller is provided with a recess for a holder which in turn holds a trigger spring which in turn bears also against a cam fastened to the axle or shaft of the control roller; the support being in the direction of turning of the control roller bearing in mind that the cam which turns the control roller is in operative engagement with abutments and stops of the control bar or bars. This trigger spring is small and economical and operates in both directions i.e. it turns the control roller to affect buffering but it turns also to effect a transport off particular station. The trigger spring whenever the control roller is at rest still exerts a tilting momentum upon that roller, and as soon as the control cam provides for release the tilt momentum becomes effective to initiate turning of the control roller and thereafter the drive belt will complete turning the control roller by 180 degrees. Depending upon the turn-off logic circuit in the system only in case of buffering i.e. when the respective downstream station or location is occupied will a turn-off command for this respective upstream station be completed to be effective in and by operation of the control roller. This means that noise in the control rollers and engagement with the control bars that may produce noise will occur only in case of actual buffering and storing. This means that the play and the wear of the particular parts is reduced.

The aforementioned trigger spring is preferably constructed as a U-shaped, but otherwise simply bent leaf spring wherein the bottom bar of the U is maintained between a cam and an indent and the legs bear under bias against the cam whereby the indent in which the spring is inserted is at least so wide as is the spring cam vis-a-vis the thickness of the leg of the spring itself.

The eccentric bearing ring of the control roller by means of which the belt roller is mounted in the control roller has a disposition in case of a lifted belt roller and as seen in direction of tension by the belt, behind the bore of the control roller for receiving its axis. On turn off of the drive i.e. upon lowering the belt rollers the resulting residual torque will not be sufficient to effect turning of the control roller owing to the constriction force of the belt as it is effective on the belt roller and friction losses result therefrom. Therefore, a second auxiliary torque or impulse is needed which is established by this constriction force itself and multiplied by the lateral horizontal spacing between the belt roller axis of rotation and the control roller axis of rotation.

In accordance with any other features of the invention the return spring is connected to the control bar through a bore in an intermediate piece. The latter piece has a slide and follower pin bearing against cam of a lever pertaining to the freight operated actuator bar. This control cam of the last mentioned lever is provided with an axle extending over the width of the roller track and carrying alternatingly hard roller elements and attenuating elements. These roller elements extend beyond the attenuating elements after the actuator bar has been pivoted down by a piece of freight. The attenuating elements are mounted on that axle or shaft permitting oscillation or pivoting and have support lips matching the periphery or jacket of the carrier rollers. The attenuating elements are configured so that upon impacting by a piece of freight upon the control bar this initial impact is reacted into the attenuating elements and not taken up by the relatively hard roller elements. Moreover the pressure force of the piece of freight forces in turn the support lips onto the carrier roller next to it whereby this still driven carrier roller will provide a follower-up force upon the attenuating element and therefore upon the actuator bar. This force supports the pivotal actuation motion of the actuator bar even in case only a relatively light piece of freight is being moved. Moreover the shape of the attenuating elements particularly the somewhat elevated backs thereof will cause noise attenuation and also attenuation of the impact of the actuator bar against the carrier roll in front. After actuation of the actuator bar the piece of freight will roll on the wearproof and easy gliding roller elements having outer contours which extend any flat portion of the attenuating elements. This way it is avoided that the forced down actuator bar becomes a brake. This feature is particularly of advantage in case the piece of freight is light because otherwise light pieces of freight could be stuck frictionally at the actuator bar.

In furtherance of the invention some of the axles of the control rollers carry an eccentrically mounted journal pin; the eccentricity being also taken in relation to the eccentric bearing ring of the particular control roller. This journal pin ill force a longitudinally fixed brake belt from below against the carrier roll thereabove provided of course the control roller has been turned to lift the journal pin accordingly. The 180 degrees turning motion of the control roller for lowering or lifting the belt through the belt roller it carries will actually be used in a reverse manner through this particular brake or brake actuating roller. In case the belt roller is lowered the brake roller, through the journal pin, will be lifted causing in fact constriction of the brake belt in between respective two carrier rollers. The resulting friction between brake belt and carrier roller as well as between carrier roller and freight will cause a reduction in kinetic energy of the freight and of the carrier rollers until both come at rest. On restarting i.e. removing freight out of the buffer place and station the belt roller is lifted and the brake roller lowered i.e the drive belt is caused to engage the carrier rollers while the contact of the latter with the brake belt is released. Just as in case of turn-off i.e. on lowering the control roller the auxiliary momentum of the trigger spring is not sufficient but also here the constriction force exerted by the break belt upon the break roller is a retarding effect, so that one needs a second auxiliary torque which in this case is the torque resulting from that constriction force and the lateral horizontal spacing between the axis of rotation of the brake roller and the axis of rotation of the brake eccentricity.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGS. 1–4 show portions of a roller track in accordance with the preferred embodiment of the present invention and illustrating different positions for buffer storage in the stop-and-go configuration;

FIG. 5 is a section showing a portion of a longitudinal section through the roller track shown in FIG. 1 and showing the same on an enlarged scale;

FIG. 6 is a top view of the portion shown in FIG. 5;

FIG. 7 is a side elevation of one of the control bar extensions used in the equipment above;

FIG. 8 is a top view of the extension bar shown in FIG. 7;

FIG. 9 illustrates a control bar in side view;

FIG. 10 is a top view of FIG. 9;

FIG. 11 illustrates a section of FIG. 5 shown in an enlarged scale;

FIG. 12 is a top view of the section shown in FIG. 11;

FIG. 13 is a section taken along XIII—XIII as indicated in FIG. 11;

FIG. 14 is a section taken along the plane XIV—XIV as indicated in FIG. 11;

FIG. 15 is a longitudinal section view through a control roller and the associated belt roller used in the device shown above;

FIG. 16 is a view taken in the direction of A as indicated in FIG. 15;

FIG. 17 illustrates a view as indicated with arrow B in FIG. 15;

FIG. 18 is a top view of FIG. 15;

FIG. 19 illustrates the disposition of a control roller when the drive belt is lowered;

FIG. 20 illustrates the position of a control bar when the drive belt has been lowered as indicated in FIG. 19;

FIG. 21 illustrates a disposition of a control roller during driving the carrier rollers;

FIG. 22 illustrates the disposition of the control bar upon driving the control roller as shown in FIG. 21

FIG. 23 illustrates an intermediate lever in front view;

FIG. 24 is a side elevation of the lever shown in FIG. 23;

FIG. 25 illustrates a brake already illustrated in FIG. 1 but now on an enlarged scale;

FIG. 26 is a portion of a longitudinal section of another roller track also shown in an enlarged scale;

FIG. 27 is a top elevation of the track shown in FIG. 26;

FIG. 28 illustrates another control bar extension in side elevation;

FIG. 29 is a top view of the bar extension shown in FIG. 28;

FIG. 30 is a side elevation of another control bar;

FIG. 31 is a top elevation of FIG. 30;

FIG. 32 illustrates on an enlarged scale a section of the section shown in FIG. 26;

FIG. 33 is a top elevation of FIG. 32;

FIG. 34 is a section taken along plane XXXVI—XXXVI through the device shown in FIG. 32;

FIG. 35 is a section view taken in the plane XXXVII—XXXVII through FIG. 32;

FIG. 36 is a longitudinal section view through a control roller in combination with a belt roller;

FIG. 37 is a view taken in the direction of arrow A as indicated in FIG. 36;

FIG. 38 is a view taken in the direction of arrow B in FIG. 36;

FIG. 39 is a top elevation of FIG. 36;

FIG. 40 illustrates a disposition of the control roller for lowered drive belt;

FIG. 41 illustrates the disposition of the control bar for lowered belt as indicated in FIG. 40;

FIG. 42 illustrates the disposition of the control roller during driving of the carrier rollers;

FIG. 43 illustrates the disposition of the control bar during driving of the control roller as shown in FIG. 42;

FIG. 44 is a front elevation of an intermediate piece; and

FIG. 45 is a side elevation of the intermediate piece shown in FIG. 44.

Proceeding now to the detailed description of the drawings in FIG. 1 and others are illustrated a plurality of carrier rollers 2 of a roller track mounted in between side elements or wall elements pertaining to and defining a fame. Shown specifically in FIG. 1 are actuator bars 4 within that roller track portion, they extend over and above the transport level and plane established by the carrier rollers 2. The figure moreover illustrates three storage stations or buffer locations A,B, and C. This means specifically that stations A,B and C are established by groups of rollers 2 which can selectively be turned on and off for driving, so that a piece of luggage, freight etc. can be driven into, through and out of the respective station or held therein for temporary buffer storage.

The rollers 2 can be in frictional engagement with a drive belt 3, whereby specifically the drive belt 3 is lifted into engagement with carrier rollers by belt rollers 5 when lifted. The belt 3 as far as its upper stringer is concerned is in fact in engagement with the carrier rollers 2 if and only if and where the belt rollers 5 are lifted. These belt rollers 5 can be lifted in groups under utilization of control bars 10A, 10B and 10C. Each of these control bars 10A, 10B etc has a control bar portion proper, 10 and a control bar extension 11. These control bars are configured so that for each of them a certain portion, roughly one half, is associated with and positioned underneath a particular storage and buffer location while another portion of each such control bars extends to the buffer and storage location downstream. This is a somewhat arbitrary description, but it can be seen, how control bar 10B extends under stations A and B, control bar 10C extends under stations B and C. These control bars 10A, 10B and 10C are actually put side by side i.e. in a kind of staggered relationship and transverse to the plane of the drawing of FIGS. 1-4. The angled off disposition is not real but chosen here only for purposes of facilitating illustration. In fact they are arranged side by side by being spaced transversely to the plane of the drawings (see e.g. FIG. 6).

The buffer place A can be deemed to be situated just ahead of the end of the roller track and its control bar 10A was placed into a preparatory position by means of an electromagnet which is not illustrated. In other words the control bar 10A did undergo a shifting displacement by about 8 mm. Control bar 10A has thus passed at the point illustrated in FIG. 1 through about half its entire control still stroke e and bears by means of a projecting trigger nose 10a against a trigger stop or abutment 8a of a cam dish 8 in a control roller 7. This occurs following a shift of any of the control bars 10 shown as far as the control motion is concerned in greater detail and explained with reference to FIG. 22, but still in this case the particular belt roller 5 in a control roller 7 and actually all of the belt rollers in the station A lift the drive belt 3 in fact to a position somewhat between the respective two carrier rollers 2 such as is shown in greater details in FIG. 21, so as to maintain driving engagement.

The shift stroke .may also occur as a result from a different situation. Given the buffer station A the respective downstream station to the right experienced arrival of a piece of freight so that its particular actuator 4 was forced down. The buffer place A was not turned off by this shifting stroke e because the control cam 8b still bears the turn on abutment or stop 11d of an control bar extension of the control bar 10B which therewith covers by means of that extension also the area normally under control of the control bar portion 10 of control bar 10A.

In the particular situation the shown in FIG. 2 a piece of freight forced the actuator lever or bar 4 in storage location A in doWn direction and thereby caused control bar 10B to undergo an idle stroke via the intermediate lever 9 whereby a compensating spring 14 engaging the lower end of the intermediate lever 9 is tensioned by the amount indicated of the distance or spacing c. The idle stroke a suffices in order to prepare the cam 8 of all control rollers 7 in the buffer station A for release. An additional trigger stroke is needed so that the control rollers 7 can be turned by 180 degrees whereupon the belt rollers disposed eccentrically in these respective control rollers 7 can be lowered therewith so that the drive belt 3 will no longer engage any carrier roller 2 in the area of buffer storage station A. The other storage locations and stations of course remain unaffected by this disengagement. FIG. 19 illustrates particularly this disengagement of the drive belt 3 from the carrier rollers 2.

The trigger stroke b is produced by the just tensioned spring 14, acting on control bar 10B. Thus stroke b produces a torque i.e. a rotating pulse upon the control roller 7 whereby the tip of the tongue of the surface segment 7a enters the slide range of the drive belt 3. Owing to the tension in the belt and after release of the control abutments or cams 8b and 8c, belt will force further rotation of the control roller 7. This occurs in parallel on all rollers 7 in station A.

A control roller 7 was enabled to rotate because the control cams 8b and 8c were released by the turn-on stops 10d and 11d respectively of the control bars 10B and 10A due to their axial displacement and shift strokes. A control preparation is now carried out in a buffer storage B owing to the just mentioned axial displacement of the control bar 10B. The trigger nose 10a of the control bar 10B is urged against the trigger stop 8a of the control cam disk 8. Since the trigger stroke b will be carried out only after the respective actuator bar 4 in storage space and station B was actuated, it is necessary that a compensation occurs at the intermediate lever 9 in that station and of the compensating spring 14 therein. The compensating spring 14 is tensioned over the spring path c. Consequently energy is stored and later Will be released as the trigger stroke b occurs in station B and the release has become effective as trigger energy as well as tension energy for the return spring 15.

In the case illustrated in FIG. 3 freight has now reached buffer station or place B and operated the actuator bar 4 thereof. Accordingly the belt rollers 5 in this station were lowered so that the belt 3 released the carrier rollers 2 of that station and buffer place B. The control bar 10C underwent a stroke e which was sufficient for releasing all control cam disks 8 of station and storage space B. The control bar 10B provides a trigger stroke b by operation of the energy released from its compensating spring 14. Simultaneously some of that energy is used to tension the return spring 15 of station and buffer place A in order to be available in case the station is reactivated, as trigger energy. The control bar 10B and its trigger nose 10a establish a 180 degree turning motion of the control cam disks 8 and the control rollers 7 in station B whereby then the particular belt roller being eccentrically mounted in that control roller was lowered. Simultaneously control bar 10C underwent an axial shift and displacement by the stroke length e in preparation for stopping the station and storage place C whereby the compensating spring 14 of location and station B was tensioned and its intermediate lever 9 was pivoted, which brought about stoppage of the rollers 2 in station B.

As far as the situation in FIG. 4 is concerned it is assumed that locking in station and location A was released. The control bar 10A was shifted by means of a turn-on stroke in the direction of transport and by operation of a turn-on magnet not shown herein. This turn-on stroke is defined as the sum of the control strokes a and b which had been defined and explained with reference to FIG. 3 and this turn-on stroke for station A causes, through triggering by means of the turn-on trier b of control bar 10A, another 180 degrees rotation of the control rollers 7 by operation of the trigger stop 8a of the control cam disk 8. The belt rollers 5 mounted in the control rollers 7 are thereby lifted so that the drive belt is again urged against the carrier rollers 2 of station and location A. The turning motion of the control cam 8 in each instance is limited by operation of abutment of the control cam and stop 8c against the turn-on stop 10d of the control bar 10A. the rotation is supported by the tension of the drive belt 3 as engaging the surface segment 7a of the control roller 7.

As soon as the rear edge of the piece of freight that was temporarily held in station and location A has cleared the station, the return spring 15 therein will pull the control bar 10B through the stroke d in direction of transport and thereby causes the actuator bar 4 in station A to be pivoted up again and into the transport path. During bar 10B provide a turning impulse upon the control cam 8 by operation of its trier stop 8a so that as a consequence the belt rollers 5 being eccentrically mounted in the control rollers 7 are all lifted to cause the belt 3 to be urged against the carrier rollers 2 of station and location B and the piece of freight in that station is now advanced. The stroke d moreover is effective additionally in station and location B in that the turn-on stops 10d of the control bar 10B limit the rotation of the control cam 8 and therefore of the control roller 7 by operation of the control abutment 8c. When the rear edge of the piece of freight that was held in station B has cleared the actuator bar 4 of that storage location B the compensating spring 14 in station B is released and the control bar 100 will undertake a idle return stroke and therefor terminates the preparatory condition for stoppage in location and place C. Here then the return spring 15 of location and station B is released through the stroke d.

After having described in general terms the operation of the device involved, particular reference is mate to the enlarged view of a section of the roller track shown in FIGS. 5 and 6. FIG. 5 in particular shows a section through this roller track as such and FIG. 6 shows a longitudinal section through the side wall with various control elements in top elevation. FIGS. 11–14 illustrate certain elements and enlargements from FIG. 5 and FIG. 6 as well as cross sections through the enlarged elements.

The carrier rollers 2 are shown to be mounted in the frame walls 1 and in each storage location and station one of the carrier rollers 2 is provided with an actuator bar 4. The actuator bar 4 in each instance is configured as a two arm lever 4a having a bore 4b by means of which it is journaled on the axle 2a of the particular carrier roller 2. A complex control cam 4c (see also FIG. 11) is mounted on the lever 4a at the end of the actuator bar 4 as such. This control cam 4c is provided for cooperation with a slide or cam pin 9a of the intermediate lever 9 and illustrated in greater detail in FIGS. 23 and 24. The intermediate lever 9 is provided additionally with a tilt or pivot pin 9b by means of which the lever is mounted in a pin bore 11h of the respective control bar extensions 11 as shown in FIG. 7.

The intermediate lever 9 is provided at its lower end with a suspension or fastening bore 9c for one end of the compensating spring 14. The lever 9 is furthermore provided with a control and actuation surface 9d bearing against an abutment or stop 13c of an element carrier 13 whenever the actuator bar 4 is raised into an upright position. As shown in greater detail in FIG. 6 the element carrier 13 is fastened to the frame wall 1 by means of screws 16. Element carrier 13, moreover. carries the axles 19 for the several control rollers 7. The side or frame walls 1 of a particular roller track are interconnected by means of cross bars 17 under utilization of bolts 1.

The element carrier 13 in each instance is constructed as a section piece with L-shaped cross section. The lower horizontal bar or leg 13a is provided with a bore 13b for springs particularly for receiving the respective other end of the compensating spring 14 and another of these bores receives one end of the return spring 15. The horizontal surface of the lower leg 18a, moreover, serves as a sliding support for the lower and return portion of the drive belt 3. As shown in FIG. 18 the leg 18a is provided for this purpose at one end with a run-off or slide on nose 13d; see also FIG. 5. FIG. 13 moreover shows a cover for the drive belt 3 as well as for the control rollers 7 by means of a piece 30 with shaped cross section and complexitylike carrier 13 a rectangular enclosure upper flanges 30a of which 30 are situated between the carrier rollers 2 as shown particularly in FIG. 11.

FIGS. 7 and 8 illustrate in detail a control bar extension 11. This bar extension is provided with a roller slot 11e. The control bar 10 shown in FIGS. 9 and 10 is provided with a roller slot 10e to thereby being supported and guided in relation to axle or shaft 19; these features are also shown in FIG. 6 and 14. The effective length of a control bar 10 together with one or more control bar extensions 11 will extend at least under two juxtaposed storage stations and buffer locations as was described with reference to FIG. 1–4. Also as stated their configuration is not to be understood in the physical sense as being depicted in FIGS. 1–4 but they are positioned flat one behind another or next to each other as shown particularly in FIGS. 6, 12 and 14. Any of the control bars 10 provided with a crimped portion at one end so as to establish a connection slot 10g for a connecting angle piece 11g of the particular extension 11 to which it is connected. The connection is secured by means of clamping piece 12 which is shifted over the angle 11g so as to make the connection secure.

The control bar extension 11, moreover, as provided with an eye 11a for connection to a spring and here particularly the return spring 15. Extension piece 11, also, has a bore 11h mentioned above for receiving the tilt and pivot pin 9b of the intermediate lever 9. Moreover the bar extension 11 is provided with a mounting and assembling slot 11f and with three angled-off and projecting turn-on abutments and stops 11d which project through roller slots 10e of any of the control bars whenever installed and serve as bearing support for the control cam 8b of the control cam disk 8. The cross bars 17 for the frame interconnection mentioned above run through mounting slots 10f and 11f.

Any of the control bars 10 is provided with several trigger noses 10a for the respective trigger stops 8a for turn-off or disengagement of the drive. Each bar 10 is moreover provided with turn-on trigger noses 10b likewise cooperating with the trigger stops and abutments 8a of the several control cams 8 alongside the respective bar 10, for purposes of turning on i.e. for effecting engagement of the drive belt 3 with the particular rollers 2 of the station. Moreover each control bar 10 is provided with angled-off projecting turn off stops 10c as well as with turn-on 10d stops for cooperation with the control cams 8c of the control cam disks 8.

In the situation depicted in FIG. 5 the turn-on abutment and stops 10d and 11d are positioned one above each other. This is the case whenever the actuator bar 4 of a station has been forced down and when the station is in fact turned off through lowering of the particular drive belt 3. During the various control operations either the control bar 10 of a station or the control bar extension 11 therein will move so that either the turn-on stop 10d or the turn-on stop 11d is in a position in which in fact it intercepts the turning path of the control cams 8c or 8b as the case may be, and the turning of the control cam 8 and, therefore of the respective connected control roller 7, is stopped.

FIGS. 15–18 illustrate a control roller 7 together with a respective belt roller 5 and the associated control cam disk 8. The control roller 7 is provided with two tongue shaped peripheral segments 7a and a bore 7e is situated concentric to the outer surface of the segments 7a. This bore 7e receives the axle 19 as well as an eccentric bearing ring 7f carrying the bearing and mount 6 for the particular belt roller 5. The belt roller 5 traverses one of the gaps between segments 7a particularly in the area of an aperture or opening 7b that is defined between segments 7a. The control roller 7, moreover, is provided with another opening 7c being situated opposite the opening 7b, and the belt roller 6 also projects through that particular opening 7c.

The tongue shaped peripheral segments 7a have outer surfaces being concentric to the bore 7e, and the belt roller 5 is mounted eccentrically thereto. Owing to this eccentric position of belt roller 6 and depending on the relative turning angle between rollers 5 and 7, roller 5 is lowered or lifted as roller 7 juxtaposes roller 5 through opening 7e or through opening 7b to belt 3. The outer surface of segment 7a extends into the range of the drive belt 3 whenever the control roller 7 was turned somewhat by operation of the trigger stop 8a of the particular control cam 8 situated in the dropped bottom 7d of the roller 7. At an angle of about 90 degrees in relation to the trigger stop 8a the two control abutments and cams 8b and 8c, are provided and those cams are separated by a stop 8d. This stop 8d takes into consideration that the turn-on stops 10d and 11d project differently far towards the cam disks 8 as can be seen from the FIG. 14.

FIGS. 19 and 20 illustrate the disposition of the control roller 7 together with the belt roller 5 for lowered belt 3. Also illustrated is the disposition of the control cam 8 with its control cam 8c engaging the turn-off abutment or stop 10c of the particular control bar 10. FIGS. 21 and 22 illustrate the control roller 7 together with the belt roller 5 in drive position for the drive belt 3 wherein the belt partially envelops the respective carrier rollers 2. The control cam 8b abuts the turn-on stop 11d and holds therewith the control roller 7 in the illustrated disposition. If now for purposes of control action either the particular control bar 10 is shifted to the left as indicated by the arrow in FIG. 22 or as indicated by another arrow in FIG. 20 for a displacement to the right, then the trigger nose 10a hits the trigger stop 8a and causes the control roller 7 to be turned slightly. This is made possible because the control cam 8b can pass along the relatively short turn-on stop or abutment 11d, and the control cam 8c can also pass along turn on stop 10d.

As the control roller 7 is thus turned a little, one of the surface segments 7a reaches the range of the drive belt 3, and on the basis of its friction resistance, the control roller 7 will turn by 180 degrees in the other position. This way one uses the traction of the drive belt in order to provide a relatively large force requisite for obtaining the control and actuating operation using but a small trigger and control pulse for initiation.

The control force actually provided by the drive belt permits also the operation of a brake wedge 20 which in wedgelike fashion is forced in between two juxtaposed carrier rollers 2 as shown in FIG. 1 and 25, in order to stop the rollers 2 almost instantly. This brake wedge 20 is mounted to the control roller 7 by means of a follower 7g engaging the wedge element 20 in contour matching relationship. The follower 7g also engages an eccentric pin 21 facing the eccentric bearing ring 7f; ring 21 releases the brake wedge 20 in the upper position as shown in FIG. 21, while the brake is put into brake action when the belt disengages the rollers 2 as shown in FIG. 19.

In the embodiment shown in FIGS. 26 through 45 the compensating spring 14 has been omitted and instead the control roller 7 is provided with a trigger spring 32 which initiates turning of the control roller so that the belt can complete the respective 180 degrees turn. The pivotally mounted intermediate lever 9 in this case is configured as an intermediate piece which together with a bar extension 11 can be shifted forward and backward. Also in this case the trigger stop and abutment 8a as well as the noses 10a and 10b and the spring connecting eye 11a, code used in the embodiments of FIGS. 1-24, are omitted in this example.

They are functionally replaced by structure to be described. FIG. 26 illustrates a portion from a correspondingly modified roller track and FIG. 27 illustrates a longitudinal longitudinal section through the side wall with control element shown in top elevation. Enlargements of portions of FIGS. 26 and 27 are illustrated in detail in FIGS. 32–35. In this particular embodiment it is assumed that the control bars will always be shifted by a full stroke length; i.e. there is no stepwise or partial shifting as was outlined with reference to FIG. 1 through 4, but the overall operation remains the same.

Carrier rollers 2 are mounted in between the side walls 1 as before, and one carrier roller per storage location and station is provided with an actuator bar 4. The actuator bar 4 is carried by a two arm lever 4a and has a bore 4b by means of which the particular bar 4 is mounted on the axle 2a of carrier roller 2. The end of lever 4a facing away from the actuator bar 4 proper is provided with a cam section 4c as shown in FIG. 32, for engagement with a cam follower pin 9a of the intermediate piece 9. This particular intermediate piece 9 is shown in detail in FIGS. 44 and 45. The piece 9 is provided with another pin 9b by means of which it is mounted in the bore 11d of one of the control bar extensions 11 in this case; this feature is shown in FIG. 28. The intermediate piece 9 is provided at its lower end with a suspension or fastening bore 9c for the return spring 15. Also at the lower end of intermediate piece 9 a guide rail 9e is provided for abutment and engagement with the respective bar extension 11. The actuator bar 4 in this case is further provided with an axle 4d extending over the entire width of the roller track and carrying alternatingly hard roller elements 4e and soft, attenuating elements 4f which bear against a carrier roller 2 by means of support lips 4g.

The element carrier 13 shown in FIG. 27 is fastened by means of cylinder screws 16 to side walls 1 and carries the axles 19 for the control rollers 7. The side walls 1 of the roller track are again interconnected by means of transverse elements 19 under utilization of bolts 18. The element carrier 13 in this case is of U-shaped cross section, and the bottom portion 13a of the U has a connecting bore 13b for the return spring 15. The bottom 13a moreover serves as slide support in this case for the lower stringer of the drive belt 3 as shown particularly in FIG. 34. FIG. 34 also shows a cover 30 for the drive belt 3 and for the control roller 7, which also here completes a rectangle, together with the equipment carrier 13. The upper flange 30a is again established as individual pieces in between the carrier rollers 2. This arrangement is shown particularly in FIG. 34.

The control bar extension 11 shown particular in FIG. 28 is provided with a slot 11e for traversal by roller axles and the particular control bar 10 shown in FIG. 30 is provided with a slot 10e; both slots receive the axles 19 as shown particularly in FIGS. 27 and 35. The control bar 10 in this case has a crimped end being provided with a connecting slot 10g for a connecting angle piece 11g of the particular control bar extension 11 connected to it. Again the connection is made secure by means of a clamping element 12 shifted over the connecting piece 11g.

The control bar extension 11, moreover, is provided also here with a bore 11h for receiving the pin 9b of the intermediate piece 9. Still additionally the control bar extension 11 is provided with a mounting slot 11f and with turn-on stops 11d project angularly from the piece itself. These abutment stops 11d when installed extend through the roller slots 10e of the control bar 10. Stops 11d serve moreover as bearing support and abutment stops for the control (cam) 8b of the control cam 8. As was mentioned earlier the side all connecting pieces and transverse elements 17 run through the slots 10f and 11f. The control bar 10 is provided with disconnect and turn-off stops 10c which extend angularly therefrom. The same is true for turn-on abutments 10d cooperating with the control stops 8c of the control cams 8.

The particular situation depicted in FIG. 26 shows the two turn-on stops 10d and 11d in superimposed relationships. This relation is established when the actuator bar 4 has been pressed down in the particular storage station and buffer place, for that station to be turned off through lowering of the drive belt 3 thereat. During the switching operations either the control bar 10 or the juxtaposed control bar extension 11 move so that either that turn on stop 10d on the stop 11d are in a position in which they intercept the stops 8c or 8b. Any further rotation of the control cam disk 8 as well as of the control roller 7 connected therewith is now stopped.

FIGS. 36–39 illustrate the control roller 7, respective associated belt roller 5 and the likewise associated control cam 8. The control roller 7 is provided also in this example with two tongue shaped surface segments 7a and with a concentric bore 7e for receiving the axle 19 The concentricity of the bore is established vis-a-vis the outer surface of segments 7a. Also, an eccentrically mounted bearing ring 7f is provided carrying the bearing ring 6 for the belt roller 5. The belt roller 5 projects beyond the gap 7b between the surface segments 7a; another opening 7c is provided opposite the opening 7b. The belt roller 5 may project through both openings. The tongue shaped surface segments 7a are bounded by outer surfaces which are concentric to the bore 7e and they also further establish by surfaces in abutment and sliding contact with the belt roller 5, being eccentrically mounted to the roller 7. The outer surfaces of the surface segments 7a extend into the range of the drive belt 3 whenever the control roller is turned slightly. The distance between the center of the eccentric bearing ring 7f and the center of the bore 7e for the axle or shaft 19 establishes an auxiliary or trigger pulse for lowering the drive belt 3.

The control roller 7 has, as seen from an open side, an opening 7h into which reaches a spring holder 7g as shown in FIG. 37. A central bar 32a of a U shaped tripper spring 32 is provided between the spring holder 7g and the opening 7h. The legs 32b of the trigger spring 32 bear against a spring cam 1 and will always exert a torque upon the control roller 7 via the spring holder 7g. This way the control roller 7 receives a trigger momentum which will tend to turn the roller 7. The control bars 10 prevent or permit the initial trigger rotation. If they permit the turning, the control roller 7 will be turned just sufficiently until one of its segments 7a can engage the drive belt 3 so as to obtain frictional engagement whereupon the frictional engagement, as was described earlier, takes over and turns the control roller 7. The spring cam $1 is fastened to the axle or shaft 19 without permitting relative rotation and is of oval shape. The control cam 8 in this case is provided with two control cams 8b and 8c, separated by a step 8d which again considers that the two turn-on stops 10d and 11d of the control bars project unequally far as shown in FIG. 35.

FIGS. 40 and 41 show the position of the control roller 7 together with the belt roller 5 for a lowered drive belt 3; also shown is the disposition in this case of the cam 8 with its control abutment 8b for engaging the turn-off abutment 10c of the control bar 10.

FIG. 42 and 43 show the control roller 7 as well as the belt roller 5 in driving position for engagement with the drive belt 3, and again the drive belt 3 in this case partially loops around each of the various carrier rollers 2 of the particular station. The control abutment 8c bears against the turn-on abutment 10d and holds therewith the control roller 7 in the illustrated disposition. If during operation and control the particular control bar 10 is moved to the left and in direction of the arrow as shown in FIG. 43 or to the right as shown by the arrow in FIG. 41 then the trigger spring 32 causes a slight turning of the control roller 7. This is made possible because the control cam 8b on turning can pull the short turn-on stop 11d while the control cam 8c can pass the longer turned on stop 10d. Upon further slight turning the surface segment 7a engages the drive belt 3 and owing to the friction the control roller 7 is now turned by 180 degrees into the alternative position. This way the tension force of the drive belt is used also here so that in response to a low power or low force trigger and initiation pulse, a relatively large turning force is rendered available that is necessary in order to complete the control operation causing displacement of the belt 3.

The drive belt 3 as providing the requisite control force permits also the operation of a brake roller 20a in accordance with FIG. 37. This brake roller 20a will be shifted in this case in between respective two juxtaposed carrier rollers 2 to thereby force a brake belt 20b of fixed length against the carrier rollers 2 so that these rollers are stopped. The control roller 7 is provided with an eccentric pin 21 for purposes of affixing the break roller 20a thereto. The pin 21 is disposed opposite to the bearing ring 7f and therefore lowers and raises the break roller 20a.

The invention is not limited to the embodiments described above but all changes and modifications thereof, not constituting departures from the spirit and scope of the invention, are intended to be included.

We claim:

1. Roller track arranged in sections in that individual groups of carrier rollers can be selectively drivingly connected to and disconnected from a drive belt for section by section stop-and-go operation permitting a buffer storage location for each section, there being vertically displaceable belt rollers for engaging the belt to obtain driving connection to and disconnection from carrier rollers, the improvement comprising:
    a plurality of control rollers each having oppositely situated peripheral openings and mounted for undergoing turning motion;
    means for respectively mounting eccentrically the belt rollers in the control rollers so that depending upon the angular position of the control rollers on account of any turning motion the respective belt rollers are lifted or lowered for engagement with or disengagement from the belt;
    a plurality of control bars arranged pairwise in operatively overlapping relation such that respective two of the bars function to disengage the belt from each roller track section;
    control cams respectively coupled to the control rollers and being in engagement with at least one control bar for triggering turning of the control roller to change the disposition of respective control roller to temporarily engage the belt so that the belt turns the control roller over a particular angle and turns it into a position in which the belt roller therein and the belt are lowered away from the carrier rollers;
    an actuator bar for each roller section and being coupled to one of said control bars which extends also into the respective adjacent upstream section, so that the actuator bar as well as an adjacent upstream actuator bar, upon being turned down by loads, cause said one control bar to initiate turning of the control rollers such that the respective belt roller and the belt therein disengage from the carrier rollers of the respective section, the belt provides for said turning of the control roller by frictional engagement so that the belt itself will disengage from the carrier rollers of the buffer station and the carrier rollers of said section;
    spring means connected to the control bars to obtain control operations of one section in response to an operating state of the respective next downstream section so that the load on the carrier rollers of said one section can be stopped if there is a load on that next downstream station; and
    brake means actuated by the control rollers in response to disengagement of the belt from the carrier rollers to stop the carrier rolls.

2. Roller track as in claim 1 wherein the control bars include additionally means for limiting the turning motion of the control rollers.

3. Roller track as in claim 1 wherein said actuator bar is connected to a first spring of the spring means for tensioning the spring upon being pushed down by a load so that the release of the spring triggers the onset of said turning motion of the control roller beginning the lowering of the belt roller and the respective belt in the respective section, the spring means including a second spring for being tensioned on releasing of the first spring to prepare the respective control bar to return to a position in which the pair of the control bars causes the drive belt to engage the carrier rollers through control lifting of the belt rollers in the respective section.

4. Roller track as in claim 3 wherein the second spring is connected between an element carrier in which the control rollers are formatted and one of the control bars, the first spring being connected to an intermediate lever being pivoted on the control bar and operated by the actuator bar, the first spring being also connected to the element carrier.

5. Roller track as in claim 1, wherein said brake means are included in each station to engage at least one carrier roller for positively stopping the carrier roller as the belt disengages therefrom.

6. Roller track as in claim 1 said actuator bar being mounted on a two arm lever, pivoted on one of the carrier rollers.

7. Roller track as in claim 1 said actuator bar being connected via a length compensation device to an intermediate lever, being connected via a tilt pin to said one of the control bars.

8. Roller track as in claim 1, each control roller having segments with rounded transitions at one of the respective openings.

9. Roller track as in claim 1, wherein each control bar has a principle portion and at least one extension connected thereto.

10. Roller track as in claim 1, said control bars being guided in and held by an element carrier for longitudinal displacement therein.

11. Roller track as in claim 10 said control bars having trigger noses cooperating with trigger stops of the control cams.

12. Roller track as in claim 11 said control bars being provided with turn-on and turn-off stops, cooperating with corresponding stops of the control cams.

13. Roller track as in claim 10, said control rollers being mounted in said element carriers.

14. Roller track as in claim 10, said spring means including a return spring having one end mounted in an intermediate piece connected to one of the control bars in one of the sections and having its other end connected to the element carrier.

15. Roller track as in claim 1, said actuator bar being biased by said spring means and an end that bears against one of the control bars of the respective section to which the actuator bar is connected, as well as to the respective adjacent upstream section.

16. Roller track as in claim 1, there being a trigger spring for biasing a control roller such that in response to a control bar displacement the control roller turns so as to engage the drive belt for further turning.

17. Roller track as in claim 16 the trigger spring being of an U-shaped configuration, straddling the axis of the control roller and cooperating with a cam on a cam disk.

18. Roller track as in claim 1 said actuator bar having a shaft carrying alternatingly relatively hard roller elements and relatively soft attenuating elements.

19. Roller track as in claim 18 wherein the hard elements are positioned to project beyond the attenuating elements when the actuator bar is pressed down.

20. Roller track as in claim 18, said attenuating elements having downwardly and outwardly extending support lips.

21. Roller track as in claim 1, said brake means including wedge element inserted into engagement between two of the carrier rollers.

22. Roller track as in claim 1, said brake means including a brake belt forced against at least one of the carrier rollers from below.

23. Roller track as in claim 22, the brake means including a roller eccentrically mounted on one of the control rollers and engaging said brake belt.

24. Roller track as in claim 1, the belt roller having an axis which is situated offset from an axis of the control roller.

* * * * *